Nov. 6, 1928.
C. H. WILSON ET AL
1,690,517
ELECTRICAL CONTROLLER AND RECORDER
Filed Aug. 28, 1924   3 Sheets-Sheet 1
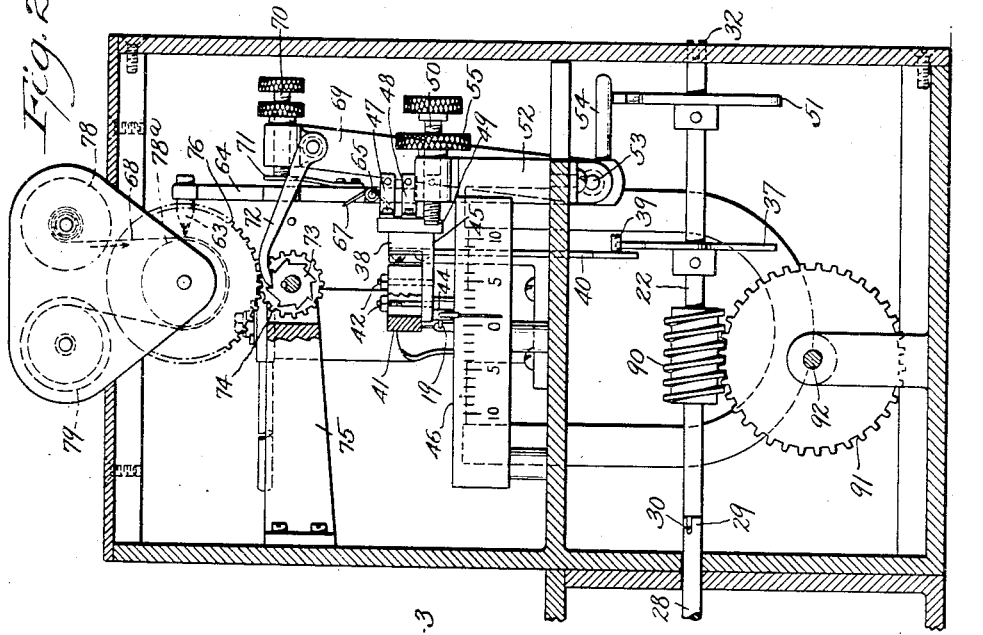

Nov. 6, 1928.
C. H. WILSON ET AL
1,690,517
ELECTRICAL CONTROLLER AND RECORDER
Filed Aug. 28, 1924      3 Sheets-Sheet 2
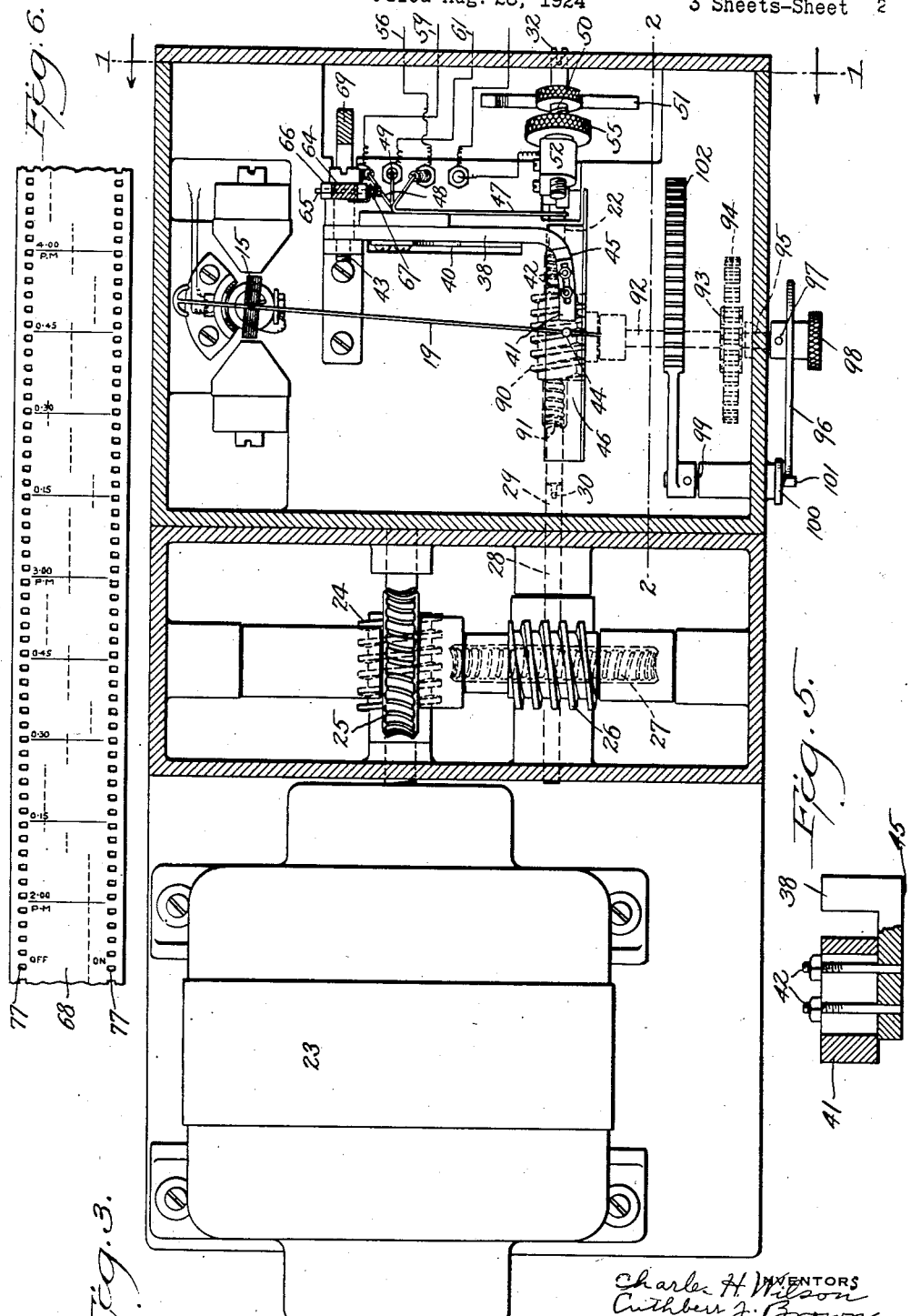

Nov. 6, 1928.
C. H. WILSON ET AL
1,690,517
ELECTRICAL CONTROLLER AND RECORDER
Filed Aug. 28, 1924     3 Sheets-Sheet 3
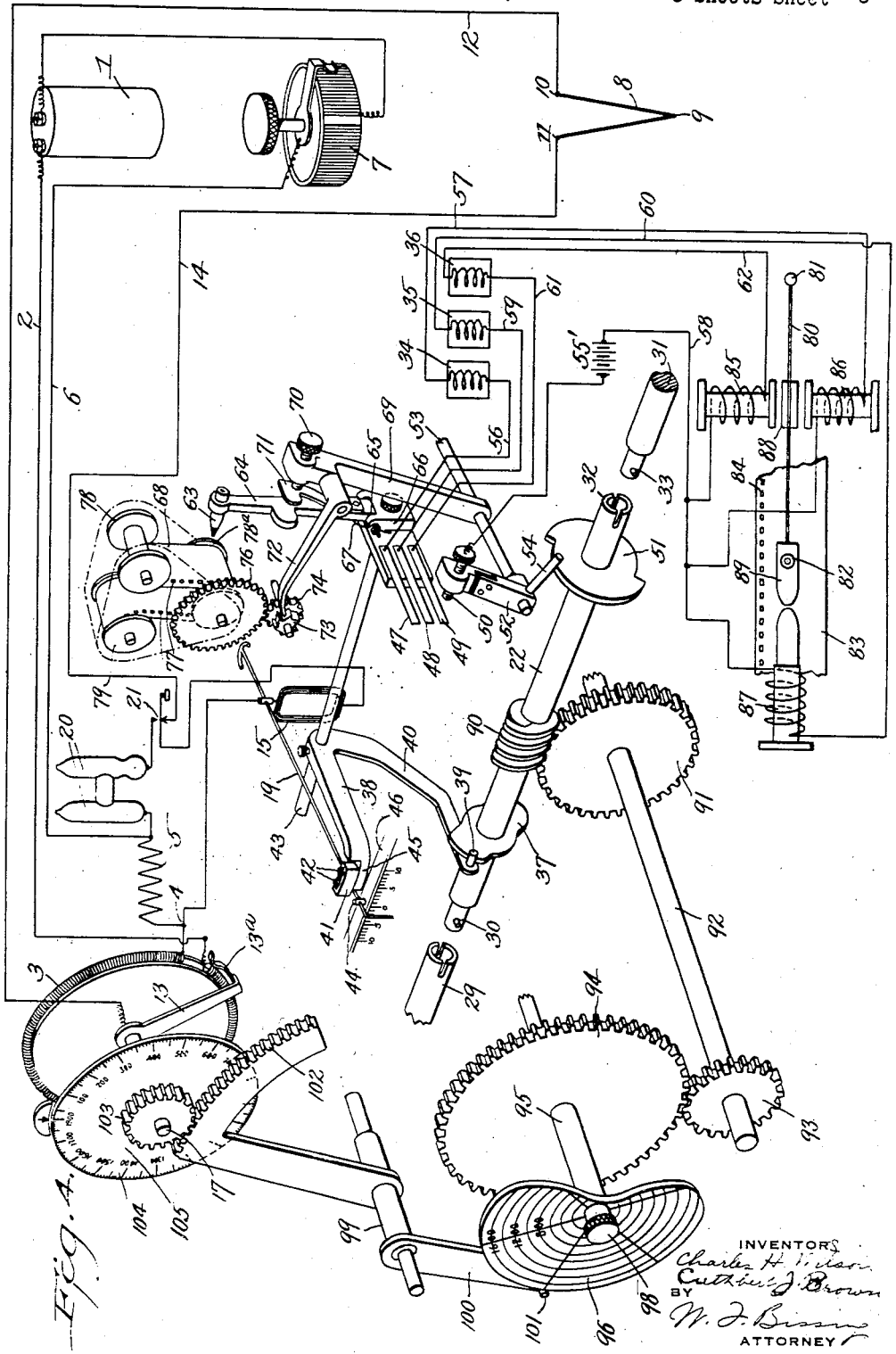

Patented Nov. 6, 1928.

1,690,517

UNITED STATES PATENT OFFICE.

CHARLES H. WILSON AND CUTHBERT J. BROWN, OF NORTH PELHAM, NEW YORK.

ELECTRICAL CONTROLLER AND RECORDER.

Application filed August 28, 1924. Serial No. 734,671.

The invention relates to an electrical control for thermic apparatus, such as electric furnaces or furnaces heated by fuel combustion, and a recorder for showing the operation of the control graphically.

One of the objects of the invention is to provide a recorder that will record the performance and sensitivity of the controller so that an inspection of the record will show when the controller has been and is operating to increase the temperature or to decrease the temperature and may also show when it stands at the desired temperature and is neither increasing nor decreasing the temperature of the furnace.

In the best embodiment of the invention, circuits are employed to control the furnace heat supply, such as the fuel supply or electric heating element, thereby making the furnace reach the desired temperature and restoring the temperature on departure therefrom, and recording means are employed for making a separate record for each control circuit, of the number of times each control circuit is actuated and the duration of the control. The recording means will show the shifting of the control impulses from one control circuit to the other, the kind of control circuit energized, i. e. whether for increasing or decreasing the heat supply and temperature, and the number and frequency of the impulses which have been sent. In one form of the invention, means are provided for recording and signaling when the desired temperature is being maintained. A stop is provided with means for bringing it to a midposition when the desired temperature is reached, the stop controlling the making or breaking of a third intermediate signal circuit, if desired, and a recorder records the number of times and the frequency that the stop reaches and remains at mid-position and the desired temperature has been attained. With such a desired-temperature position for the controller, there will be three positions for the marking device on the record paper. The impulses may be shifted from the circuit increasing the furnace temperature to the circuit decreasing it, or vice versa; or from the circuit increasing the temperature to the desired-temperature circuit, or vice versa; or from the circuit decreasing the temperature to the desired-temperature circuit, or vice versa.

When no desired-temperature position is employed, two alternative positions for the marking device on the paper are provided.

The progress of the record paper under the marker causes a line record to be drawn indicating at what period, for how long and the number of times, the controller has been issuing impulses for increasing or decreasing temperature and when it remains at an intermediate position and the desired-temperature is reached.

The autographic record will show whether or not the controller remains in one position continuously operating for increase or decrease of temperature by sending out similar impulses and if the record shows that the controller is sending out at intervals impulses for reversal of control, the controller is manifestly sensitive and together with the relays or valves is actually and actively controlling the furnace temperature.

In accordance with the invention, when a program mechanism is utilized to operate in connection with the controller, the recorder will show a reversal of impulses or pulsations sent out by the controller for the operation of relays or valves for maintaining a furnace temperature in accordance with the program schedule or predetermined rate of change of the furnace temperature as established by the program mechanism.

With the above and other objects in view, the invention consists in the parts, improvements and combinations more fully pointed out hereinafter.

Referring to the drawings, which illustrate one embodiment of the invention:

Figure 1, is a vertical cross-section on line 1—1 of Figure 3, showing the controller with its recorder, including three impulse circuits.

Figure 2, is a vertical transverse section on line 2—2 of Figure 3.

Figure 3, is a horizontal section of the apparatus shown in Figure 1, on line 3—3 of Figure 1.

Figure 4, is an illustrative diagram showing the circuits of the apparatus.

Figure 5 is a detailed cross-sectional view of an adjustable stop, and

Figure 6, is a plan view of the record strip showing the record as made by the marker shown in the upper part of Figure 4.

It will be understood that the recording means may be utilized with different forms of temperature measuring or temperature indicating apparatus, the recording means showing a record whenever the pointer or indicator moves in response to a change of current thru the galvanometer coil as an indication of temperature change in the furnace and the respective control circuit or intermediate circuit is energized. The form of pyrometer may be varied as for example being of the deflecting D'Arsonval type such as a straight millivolt pyrometer or of the electrical resistance type or of potentiometric type wherein the pointer deflections indicate out of balance between the voltage generated in the thermocouple and a standard voltage. In the drawings the potentiometric type is illustrated.

Referring now to the drawings (see particularly Figure 4), the standard or supply current for the potentiometer is supplied from a battery 1. From one pole of the battery the circuit thru the potentiometer is completed by wire 2, potentiometer variable resistance slide-wire 3 and returns to the other pole of the battery by way of connection 4, fixed standardizing resistance 5, return wire 6 and adjustable rheostat 7. The balancing current is supplied by the thermocouple 8, having a hot junction 9 and cold junctions 10, 11. Lead 12 connects the thermocouple to adjusting arm 13, carrying contact brush 13ª and lead 14 connects the couple thru key 21 and galvanometer coil 15 to the other end of slide-wire 3. The adjusting arm 13 may be adjusted so as to set the contact brush 13ª carried by it, by means of a finger piece 16 (Figure 1), carried by its shaft 17, to such a position on the slide-wire 3, that the voltage drop in the slide-wire between that end of the slide-wire to which the galvanometer armature 15 is connected and the point where the brush 13ª contacts with the wire, opposes and balances the voltage generated in the thermocouple 8 when that voltage is representative of the desired temperature in the furnace into which the hot junction of the thermocouple 8 is projected, (the furnace not being shown in the drawings). In this way the desired temperature to be maintained by the furnace may be varied and established.

By means of the standard cell 20 and the key 21, the amount of current flowing thru the slide-wire 3, may be standardized in the usual manner for calibrating the slide-wire in the ordinary form of slide-wire potentiometers. The resistance 5 is in series with slide-wire 3 and the potential drop thru 5 may be balanced and opposed by standard cell 20, by pressing key 21. When so balanced no current will flow thru the galvanometer coil and the standard current is now flowing thru the potentiometer slide-wire 3. With the current standardized thru the circuit, the proportional voltage drop along the slide-wire 3 is calibrated to agree with scale 104, which scale may be graduated in units of voltage or, preferably, in units of temperature based upon thermoelectric equivalents of thermocouple 8.

If the temperature of the thermojunction 9 exceeds or falls below the desired predetermined temperature at which the controller scale is set, it will no longer exactly balance the voltage drop in the wire of the potentiometer, between the points on the wire just mentioned and, therefore, as the normal arrangement of the thermocouple circuit is such as to connect the voltage of the thermocouple in opposition to the voltage tapped off from the wire 3, these two opposing voltages being out of balance there will be a net current flowing in one or the other direction thru the galvanometer armature 15, thus causing deflection of the armature 15 and its boom 19.

In the form of electrical controller illustrated, means are provided, separate from the galvanometer boom, but depending upon the position of the boom for selecting and closing one of three control circuits, which circuits when energized operate indicators or visible or audible signals, or relays, or switches or valves for altering the current supply in electric furnaces or for operating the fuel supply in furnaces heated by fuel combustion. Means are thus provided for establishing the desired temperature to be maintained and for energizing one or the other of the control circuits whenever the temperature of the heating apparatus is above or below the desired temperature. These means will now be described.

A shaft 22 mounted in the controller casing, is driven by some form of motor so as to make a predetermined number of revolutions in a given time interval. An electric motor 23, outside the casing may be utilized, the motor driving the shaft 22 by means of a worm 24 on the motor shaft, which in turn drives the worm wheel 25 on a counter-shaft, the counter shaft carrying the worm 26, which in turn meshes with the worm wheel 27 on shaft 28. The shaft 28 may be clutched to the shaft 22 by sliding clutch sleeve 29, the slot of which cooperates with the pin 30. Shaft 22 may drive a shaft 31 in a second electric controller for a second furnace by means of clutch sleeve 32 engaging pin 33. In this way a plurality of controllers may be driven by one motor. The three electrical control circuits, 34, 35, 36 may control respectively light or audible signals or relays or switches or valves for altering the current supply in electric furnaces or relays and valves for operating the fuel supply in furnaces heated by fuel combustion, in a well-known manner. When the current flows thru circuit 34, it causes the temperature of the furnace to increase; when current flows thru circuit 36, it causes the temperature of the furnace to decrease, and when the current flows thru circuit 35, the galvanometer needle is in the correct temperature position and a white signal light may be actuated to so indicate. These circuits are selected and closed by the cooperation of the galvanometer boom, a stop and a set of switches, the stop and switches being controlled by a cam on the controller shaft 22, another cam on the controller shaft closing the respective circuits. The cam 37 on the controller shaft operates twice for each revolution of the shaft, a stop arm 38 thru pin 39 and connecting arm 40. The stop arm 38 carries at its outer end an adjustable stop 41, secured to the arm by screws 42. The arm 38 is secured to shaft 43 and rocks with it, being lowered by gravity and raised by the cam 37. When lowered it will assume one of three positions, depending upon the relation of the end of the arm to a button 44 secured to the boom 19. When the galvanometer boom deflects out away from under the arm, the arm will drop to its lowest position, rocking the shaft 43 a corresponding amount. When the button 44 and the boom are beneath the stop 41, the arm will rock to an intermediate position and when the button and boom are beneath the end 45 of the arm, the drop or rock of the arm and consequent rocking of shaft 43 will be the least. The anvil 46 forms a support which thru the button 44 arrests the gravity drop of the arm. Means are provided whereby the rocking of the shaft 43, will move one of three switch contacts 47, 48, 49, in front of a contactor 50, thus permitting closing either one of the controlling circuits, 34, 35, 36, depending upon the rock of the shaft 43. A cam 51 on controller shaft 22 moves the contactor 50, against the spring contact 47, 48 or 49, as the case may be. The contactor 50 is mounted on an arm 52 secured to shaft 53, the arm 52 being rocked by means of a pin 54, cooperating with cam 51. Contactor 50 may be locked in its adjusted position on the arm by locknut 55. By this means when the spring contact 47 is rocked in front of contactor 50 and the latter operated by cam 51 to close the circuit, a current will flow from battery 55' thru 50, 47, wire 56, thru circuit 34, and return by wire 57 to wire 58, back to the battery. In doing so it will actuate a recording mechanism which will be described below. In a similar way when switch contact 48 is opposite point 50, current will flow from battery 55', thru 50, contact spring 48, wire 59, thru circuit 35 and return to battery by wire 60. When contact spring 49 is lowered in front of contactor 50, current will flow from battery 55' thru 50 and 49 and then by wire 61 thru circuit 36, returning to the battery by wire 62. Means are thus provided controlled by the temperature of the furnace, which actuates the thermocouple 8, causing it to deflect the galvanometer boom 19 by causing current to flow thru galvanometer armature 15, for stopping one of the switch contacts 47, 48, or 49, in front of the contactor 50, and thereby selecting the circuit 34, 35 or 36, which when actuated will indicate or produce the necessary change in the temperature of the furnace.

In accordance with the invention, means are provided for recording the control signals sent thru the circuits 34, 35 or 36. In the form of the invention illustrated, a record is made and preserved each time the contactor 50 is actuated to close its circuit, and means are also provided whereby the recorder will show by separate record, which of the contact circuits, i. e. which kind of controlling circuit has been energized, the number of times so energized, and for how long a period, or duration, the controller has been issuing signals for increasing temperature, for decreasing temperature and when the desired temperature is reached.

The means for recording the signals will now be described. These means may be varied. In the form of the invention illustrated, the record is made by means of a separate marker 63, which may take the form of a marking stylus carried by an arm 64 pivoted at 65 to a bracket 66, secured to the shaft 43. A spring 67 normally presses the stylus away from the record strip 68. Means are provided for bringing the marker 63 into contact with the record strip each time a circuit is closed at conductor 50. An arm 69 is secured to shaft 53, the outer end of the arm carrying an adjustable set screw 70. The screw 70, when shaft 53 is rocked to close the circuit, presses the arm at 64 and the marker toward the record strip and holds it in contact therewith. A spring 71 attached to arm 64 is provided so that the screw 70 may yieldingly press the marker against the record strip. This permits feeding the record strip while the stylus is in contact with the chart paper and the mark is being made.

Means are provided for feeding the record strip intermittently and at each operation of the marker. In the form illustrated, a pawl 72 is pivotally mounted upon the arm 69, the pawl engaging a ratchet 73 mounted upon a shaft carrying the gear 74. The shaft is carried in a bracket 75. Gear 74 meshes with gear 76, the gear 76, driving a pin wheel which engages holes 77 in the record strip, thus feeding the strip from spool 78 over a platen 78ª and to a re-rolling spool 79. The feed begins slightly before the marker contacts with the paper, thus spacing apart the record for each impulse, enabling the number of impulses to be readily ascertained.

Means are provided controlled by the selecting means whereby the recorder will show which of the control circuits is actuated. In the form illustrated, the marking arm 64 is mounted on shaft 43, so that the marker will move transversely across the record strip in synchronism with the action of the circuit contact spring 47, 48 or 49. The marker will thus be shifted into different zones and will make its series of marks on the record strip at one place when contact 47 is closed by contactor 50, at another place when contacts 48 and 50 are closed, and in a third place when contacts 49 and 50 are closed.

Means may be provided for actuating the marker electrically. In the form of the invention illustrated, an electrically operated recording mechanism may be utilized and placed wherever the recording mechanism is needed, the electrical recorder taking the place of or being used in addition to the recorder heretofore described. The electrical recorder comprises a pivoted marking arm 80, pivoted at 81 and carrying the marking stylus 82 at its movable end arranged above the record paper 83 which is driven by suitable means thru its perforations 84. Magnet 85 has its coil in series with the circuit 36, magnet 86 has its coil in series with the circuit 34, and magnet 87, has its coil in series with the circuit 35. When the circuit 34, 35, or 36 is energized by closing the circuit at 50, the corresponding magnet 86, 87 or 85 is energized. This will draw the marker 82 to one side of the record strip if magnet 86 is energized by attracting armature 88 or to the other side if magnet 85 is energized by attracting armature 88, or the marking point will be kept in a central position by magnet 87 attracting armature 89. The stylus will remain always in contact with the paper, each magnet making its separate and distinct record.

The mechanism heretofore described and illustrated makes use of three circuits for controlling and indicating the furnace temperature. When it is not desired to record the intermediate or desired-temperature position, the stop at the end of arm 38 is adjusted so as to provide two stop positions for the galvanometer boom, one position outside of the stop arm and the other under the stop arm. The switch point 48 may be disconnected and the intermediate circuit not utilized, if desired.

When instead of desiring the furnace temperature to be held constant, it is desired to maintain it at a predetermined progressive or retrogressive rate, as in what has been styled above and is generally known, as program control, the slide-wire brush arm 13 is not manually turned but is automatically turned by the program mechanism. In the form shown in the drawings, it is turned from shaft 22 by means of a worm wheel 90, meshing with worm gear 91 on counter-shaft 92, the shaft carrying a gear 93, meshing with gear 94, on shaft 95. On shaft 95, a program cam 96, is secured and may be positioned thereon and secured in place by set-screw 97. A finger button 98 can be used to manually adjust the parts. The program cam turns the brush arm 13, by means of a rock-shaft 99, to which an arm 100 is secured, the arm carrying pin 101 contacting with the periphery of the cam and being held thereagainst by either gravity or a spring. The gear sector 102, is secured to rock-shaft 99, and engages with a pinion 103 on the shaft 17, thus turning the brush arm 13 by rotation of the cam 96. The temperature indicating dial 104, may be left attached to the shaft 17, and turn with it (see Figure 4) or the dial 105 (see Figure 1) may be fixed and a pointer 106 on the shaft 17, may move over the dial; the dial indicates the temperatures attained by the furnace, under the action of the program cam. By this means the temperature of the furnace may be caused to rise gradually in a predetermined interval of time, or schedule, to a definite temperature and to be maintained at this temperature for a fixed interval, and the temperature of the furnace lowered gradually or quickly according to schedule. While the program mechanism is shifting the brush arm 13, the cams on shaft 22, will repeatedly act and the thermocouple 8 which is at the temperature of the furnace will provide an opposing voltage so as to balance the potentiometer voltage and cause the current to flow in the galvanometer in one direction or the other, thus keeping the furnace temperature at the point called for by the brush arm, which is actuated by the cam and the rack gearing. The shape of the cam corresponds to the desired schedule or program of temperature control.

With the parts constructed as illustrated in Figure 4, the electric motor may drive the shaft 22 at a speed of one revolution per minute and the program 96 will make one revolution in about an hour and a half but it will be understood that any desired ratio between the speed of shaft 22 and cam 96 may be maintained by utilizing suitable change speed gearing between the shaft 22 and the cam.

Having thus described the invention and its operation, it will be understood that, changes may be made in the construction for carrying the invention into effect, without departing from the principle thereof.

What we claim is:

1. In an electrical controller having a galvanometer and its boom and means providing an increasing and decreasing control for a thermic apparatus, the combination of means separate from but controlled by the galvanometer boom for selecting the controlling means to be energized, means for sending operating impulses to each of said controlling means, and means controlled by said selecting means for separately recording the duration of the increasing control and of the decreasing control.

2. In an electrical controller for heating apparatus having a galvanometer and its boom and a plurality of electrical control circuits, one of which provides means for increasing the heat supply, and another provides means for decreasing the heat supply, the combination of means separate from but controlled by the galvanometer boom for selecting the control circuit to be energized, means for sending operating impulses to said control circuits, and means controlled by said selecting means for recording the duration of the energization of the increasing control circuit and for separately recording the duration of the energization of the decreasing control circuit.

3. In an electrical controller having a galvanometer and its boom, the combination with the control circuits, of means separate from the galvanometer boom but controlled thereby for selecting the control circuit to be energized, means for sending control impulses so as to selectively energize each of said circuits and means controlled by the selecting means for separately recording the kind of control circuit so energized and the number of impulses so sent.

4. In an electrical controller and recorder provided with means including a plurality of circuits for changing the control of another apparatus, said means being controlled by a measurable condition of the other apparatus under control, a separate marking device, and means for moving said marking device into different zones in synchronism with said means for changing the control.

5. In an electrical controller provided with a plurality of means for changing the control of a furnace, said means being controlled by a galvanometer, which is controlled by the temperature of the furnace, a separate marking device and means for shifting said marking device into the desired zone in synchronism with selecting the means for changing the control.

6. In an electrical controller for controlling furnace temperatures, the combination with two control circuits and a signal circuit of means depending upon the temperature of the furnace for selecting the control circuit, means for sending control impulses so as to selectively energize each of said circuits, and means controlled by said selecting means for separately recording the kind of circuit so energized and the number of impulses so sent.

7. In an electrical controller for controlling furnace temperatures, the combination with the control circuits, of a galvanometer, means depending on the temperature of the furnace for actuating said galvanometer and its boom, separate means controlled by the boom for selecting one of the control circuits, and means controlled by the selecting means for making a separate record of which control circuit is selected, said record showing the number of times the circuit is energized.

8. In an electrical controller for controlling furnace temperatures, the combination with the control circuits of a galvanometer, potentiometer means depending upon the temperature of the furnace for actuating said galvanometer and its boom, separate means controlled by the boom for selecting each one of the control circuits and means controlled by the selecting means for separately recording which control circuit is selected and the number of times it is energized.

9. In an electrical controller for controlling furnace temperatures, the combination with the control circuits of a galvanometer, potentiometer means depending on the temperature of the furnace for actuating said galvanometer and its boom, means for adjusting the potentiometer so as to vary the desired temperature at which the furnace may be maintained, separate means controlled by the boom for selecting each one of the control circuits and means controlled by the selecting means for separately recording which control circuit is selected and the number of times it is energized.

10. In an electrical controller for controlling furnace temperatures, the combination with the control circuits, of a plurality of movable switch contacts one for each circuit, means controlled by the temperature of the furnace for stopping one of the switch contacts in a predetermined position, means for intermittently closing the circuit thru the selected switch contact and means controlled by the moving switch contacts for making a record each time a circuit at the switch contact is closed.

11. In an electrical controller for controlling furnace temperatures, the combination with the control circuits of means depending upon the temperature of the furnace for sending control impulses so as to selectively energize each of said circuits, means for separately recording the kind of control circuit so energized and the number of impulses so sent, said means comprising a marking device, a record chart, means for shifting the marking device across the chart into separate zones, and means for moving the device toward the chart and means for operating said shifting means and said moving means synchronously with the means for selectively energizing each of said circuits.

12. In an electrical controller for furnaces, the combination of a plurality of circuits for controlling the furnace temperature, a plurality of corresponding control switches, one for each control circuit, means for shifting the control switches, a recorder, means for shifting the marking device of the recorder, each time the control switches are shifted, and means for operating the marking device to make its record each time the circuit is closed thru the selected switch.

13. In an electrical controller having a plurality of circuits for controlling the furnace temperature, a galvanometer boom, a movable stop cooperating therewith, a switch contact for each circuit, means for moving said switch contacts in synchronism with the movement of said stop, a recorder, means for shifting the marker of said recorder in unison with the movement of said switch contacts, and means for operating said marker each time the circuit thru one of said contacts is closed.

14. In an electrical controller for controlling temperatures, the combination with the control circuits of means for selecting the circuit to be energized, of means for sending control impulses so as to selectively energize said circuits, a potentiometer pyrometer having an adjustable resistance arm, program means for adjusting said resistance arm, and means controlled by said selecting means for making a separate record of the duration of impulses so sent for each kind of control circuit so energized.

15. In an electrical controller for controlling temperatures, the combination with the control circuits of means for selecting the control circuit to be energized, of means for sending control impulses so as to selectively energize said circuits, a potentiometer pyrometer having an adjustable resistance arm, means for adjusting said resistance arm, and means controlled by said selecting means for making a separate record of the duration of impulses so sent for each kind of control circuit so energized.

16. In an electrical controller for controlling furnace temperatures, the combination with the control circuits, of a switch for each circuit, a galvanometer and stop controlled by said galvanometer cooperating therewith, a thermocouple controlling said galvanometer, a connection between the switches and stop so that the selected position of the switch is controlled by the position of the stop, a recorder having a marking device and means for feeding a record chart, and means for intermittently operating said record chart and said marking device each time the circuit is closed thru one of said switches, thereby making a separate record for each control circuit energized.

17. In an electrical controller for controlling furnace temperatures, the combination with the control circuits of a switch for each circuit, a galvanometer and stop controlled by said galvanometer cooperating therewith, a thermocouple controlling said galvanometer, connections between the switches and stop so that the selected position of the switch is controlled by the position of the stop, a recorder having a marking device, and means for supplying record paper, a rotary shaft, connections between said shaft and said stop and between said shaft and said marking device, thereby actuating said stop and said marking device in unison, and thereby making a separate record for each control circuit energized.

18. In an electrical controller the combination with the control circuits of a temperature controlled galvanometer boom, of means separate from said boom for selecting the control circuit, means for sending control impulses to selectively energize said circuits, said selecting means including a three-position stop which is adapted to cooperate with said boom and means controlled by said boom for recording the number of times the stop stops at mid-position.

19. In an electrical controller provided with a plurality of controlling circuits of a temperature controlled galvanometer boom, means including a stop arm cooperating with the boom for selecting the controlling circuit to be energized, means for sending operating impulses to said controlling circuits, and means controlled by said selecting means for marking a separate record for each kind of controlling circuits actuated by the impulses.

In testimony whereof, we have signed our names to this specification.

CHAS. H. WILSON.
CUTHBERT J. BROWN.